United States Patent
Chuang

(10) Patent No.: US 10,018,278 B2
(45) Date of Patent: Jul. 10, 2018

(54) AUTOMATIC WATER-SAVING DEVICE FOR FAUCET

(71) Applicant: APLUS HARDWARE CORP., Taipei (TW)

(72) Inventor: Yung-Huang Chuang, Taipei (TW)

(73) Assignee: APLUS HARDWARE CORP., Taipei (TW)

( * ) Notice: Subject to any disclaimer, the term of this patent is extended or adjusted under 35 U.S.C. 154(b) by 49 days.

(21) Appl. No.: 15/373,410

(22) Filed: Dec. 8, 2016

(65) Prior Publication Data

US 2018/0128384 A1 May 10, 2018

(30) Foreign Application Priority Data

Nov. 9, 2016 (TW) .............................. 105136412 A

(51) Int. Cl.
*E03C 1/02* (2006.01)
*F16K 11/04* (2006.01)
*F16K 31/44* (2006.01)

(52) U.S. Cl.
CPC ................ *F16K 11/04* (2013.01); *E03C 1/02* (2013.01); *F16K 31/44* (2013.01); *E03C 2001/026* (2013.01)

(58) Field of Classification Search
CPC .......... E03C 1/04; E03C 1/0404; E03C 1/086; E03C 1/02; E03C 2001/026; E03C 1/2306; B05B 1/30; B05B 1/3013; B05B 83/20; B05B 83/48
USPC ........... 137/513.5, 801; 239/428.5, 569, 579, 239/583, 435, 445, 447
See application file for complete search history.

(56) References Cited

U.S. PATENT DOCUMENTS

| | | | | |
|---|---|---|---|---|
| 5,704,397 A * | 1/1998 | Lu | ............................... | E03C 1/08 137/630.15 |
| 6,131,608 A * | 10/2000 | Lu | ........................... | F16K 31/385 137/550 |
| 8,757,518 B2 * | 6/2014 | Kao | ........................ | E03C 1/0412 137/801 |
| 2009/0045370 A1 * | 2/2009 | Kao | ........................... | E03C 1/08 251/324 |
| 2009/0242819 A1 * | 10/2009 | Gao | ........................... | E03C 1/04 251/323 |
| 2010/0051845 A1 * | 3/2010 | Liao | ........................... | E03C 1/08 251/155 |

(Continued)

*Primary Examiner* — Marina Tietjen
*Assistant Examiner* — Paul J Gray
(74) *Attorney, Agent, or Firm* — Hershkovitz & Associates, PLLC; Abe Hershkovitz

(57) ABSTRACT

An automatic water-saving device has a housing, a lower holder, an upper holder, an actuation rod, a blocker, a first resilient member, and multiple positioning balls. The actuation rod, the blocker, the first resilient member, and the positioning balls are disposed between the lower and the upper holders. The lower and upper holders are disposed in the housing. Each of the lower and the upper holders has multiple holes for water flowing. The upper holder further has multiple mouths for water flowing. The automatic water-saving device has the advantage of automatically recovering the water discharge capacity back to small volume after manually adjusting the water discharge capacity to large volume. Hence, the water-saving function of the automatic water-saving device is enhanced and ensured, and the automatic water-saving device is convenient in use.

18 Claims, 6 Drawing Sheets

(56) References Cited

U.S. PATENT DOCUMENTS

2013/0068860 A1\* 3/2013 Tempel ................ B05B 1/3033
239/428.5

\* cited by examiner

AUTOMATIC WATER-SAVING DEVICE FOR FAUCET

CROSS-REFERENCE TO RELATED APPLICATION(S)

This application is based upon and claims priority under 35 U.S.C. 119(a) from Taiwan Patent Application No. 105136412 filed on Nov. 9, 2016, which is hereby specifically incorporated herein by this reference thereto.

BACKGROUND

1. Technical Field

The present invention relates to a water-saving device, and specifically to an automatic water-saving device for a faucet.

2. Description of the Prior Art(s)

With the rising environmental awareness, concepts of energy saving and conservation of resources have become dominant A variety of energy-saving or resource-economizing devices are manufactured and sold on the market.

Among the issues in the environmental protection, economizing water resource is a significant one that deserves intensive attention. Hence, a water-saving device adapted for mounting on the outlet of a faucet is provided. The water-saving device may decrease the water discharge capacity of the faucet.

Additionally, the water-saving device comprises a switch for adjusting the water discharge capacity. Specifically, the water discharge capacity may be increased by pushing the switch and restored by pushing the switch again.

However, the disadvantage of the water-saving device lies in that after the water discharge capacity is increased by the switch, the water discharge capacity can only be restored by pushing the switch again and the restoration to small water discharge capacity cannot be done by operating the water tap of the faucet. As a user is very likely to forget pushing the switch again for decreasing the water discharge capacity after increasing the water discharge capacity, a large water discharge capacity may be applied when the next user opens the water tap of the faucet without awareness. Accordingly, the water-saving function of the water-saving device is lost.

To overcome the shortcomings, an automatic water-saving device for a faucet to mitigate or obviate the aforementioned problems is provided.

SUMMARY

An objective of the present invention is to provide an automatic water-saving device to overcome the technical limitation in recovering the water discharge capacity back to small volume automatically after the water discharge capacity is manually adjusted to large volume.

In accordance with an embodiment of the present invention, the automatic water-saving device comprises a housing, a lower holder, an upper holder, an actuation space, multiple transverse tunnels, an actuation rod, a blocker, and a first resilient member. The housing comprises a bottom wall, an inner space, a top opening, multiple first discharge holes formed through the bottom wall, and a through hole formed through a center of the bottom wall. The lower holder is disposed in the inner space. The lower holder comprises a perforation and multiple inner flow holes disposed around the perforation. The upper holder is disposed in the inner space and on a top surface of the lower holder. The upper holder comprises multiple first inlet holes and multiple mouths. The actuation space and the transverse tunnels are surrounded by the top surface of the lower holder and a bottom surface of the upper holder. The actuation space extends vertically and corresponds to a center of the upper holder. The transverse tunnels are transversely connected with the actuation space. The actuation rod is mounted between the lower holder and the upper holder. The actuation rod is vertically movable relative to the lower holder and the upper holder. The actuation rod comprises an upper actuation portion mounted in the actuation space and being vertically movable, and a lower actuation portion mounted through the perforation and having an external diameter smaller than the upper actuation portion. The blocker is mounted between the lower holder and the upper holder. The blocker is vertically movable relative to the lower holder and the upper holder. The blocker surrounds the actuation space and the transverse tunnels. The blocker has a top surface selectively closing the mouths. The first resilient member is disposed between the lower holder and the blocker. The first resilient member pushes the blocker upwardly. The positioning balls are disposed in the transverse tunnels respectively. The positioning balls are disposed between the actuation rod and the blocker. The upper actuation portion selectively abuts the positioning balls transversely and the blocker selectively abuts the positioning balls downwardly.

When the faucet is opened, the water only flows through the first inlet holes, the inner flow holes, and the first discharge holes in sequence, and the water discharge capacity is small, thereby saving the water. When the button is pushed, the positioning balls in the transverse tunnels move towards the actuation space and open the mouths. In this way, the water may further flow into the mouths and flow out from the first discharge holes, so as to increase the water discharge capacity. After the faucet is closed, the positioning balls move back to the original position by the first resilient member and the mouths are closed. In this way, the water is only allowed to flow through the first inlet holes, the inner flow holes, and the first discharge holes in sequence when the faucet is opened again. That is, the water discharge capacity is small when the faucet is opened again.

Accordingly, the automatic water-saving device is not only able to save water, but also able to automatically recover the water discharge capacity back to small volume after the water discharge capacity is manually adjusted to large volume. In other words, the water-saving function of the automatic water-saving device is enhanced and ensured, and the automatic water-saving device is convenient in use. In sum, the automatic water-saving device is economized in water-saving.

Other objectives, advantages, and novel features of the embodiments of the present invention will become more apparent from the following detailed description when taken in conjunction with the accompanying drawings.

DETAILED DESCRIPTION

Figure 1:
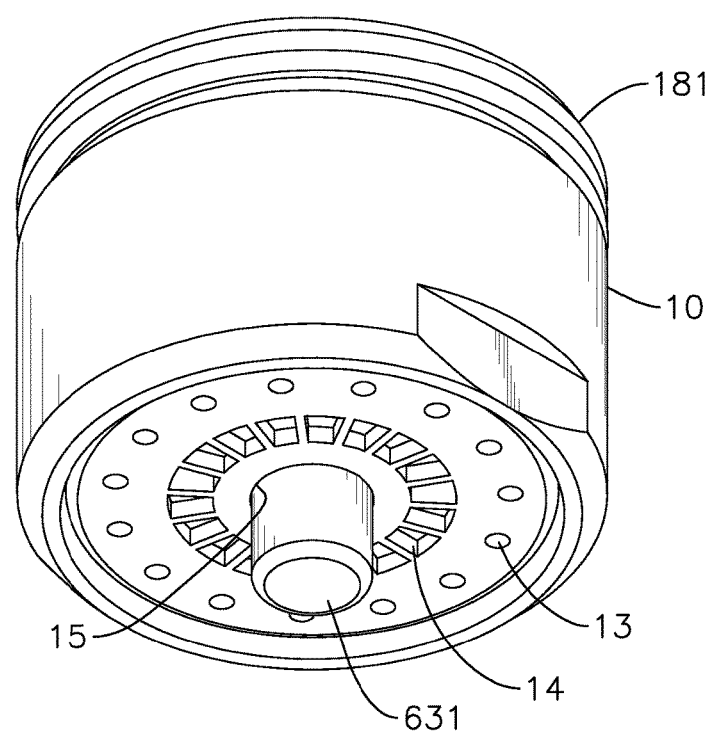
FIG. 1 is a perspective view of an automatic water-saving device in accordance with the present invention.

With reference to FIGS. 1 to 4, an automatic water-saving device of the present invention comprises a housing 10, a lower holder 20, an upper holder 30, an actuation space 91, multiple transverse tunnels 92, an actuation rod 40, a blocker 50, a first resilient member 61, and multiple positioning balls 70. In an embodiment, the automatic water-saving device further comprises a mounting shell 18, a baffle 63, a second resilient member 62, multiple plugs 80, and a filter 33.

Figure 2:
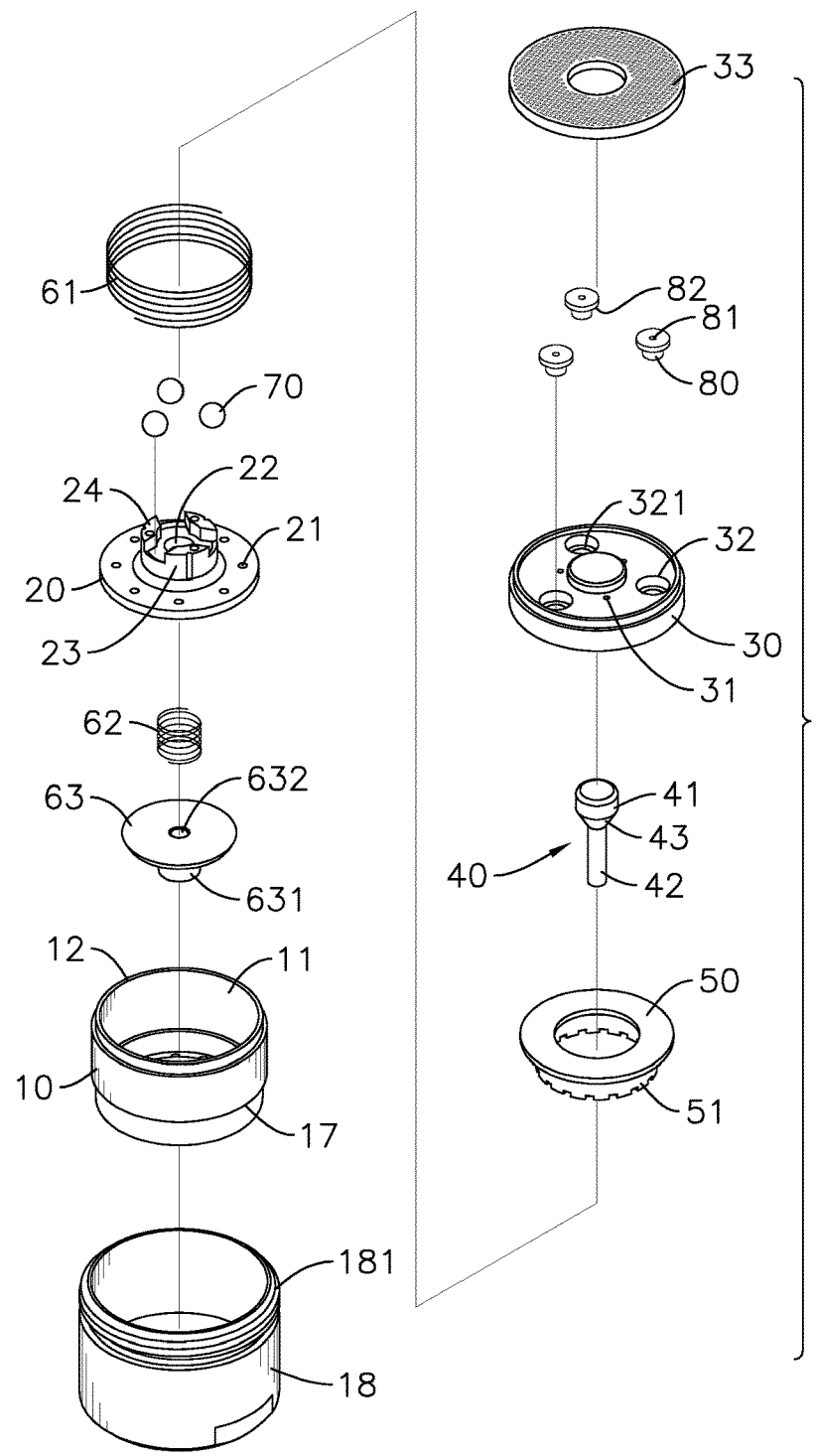
FIG. 2 is an exploded perspective view of the automatic water-saving device shown in FIG. 1.
Figure 4:
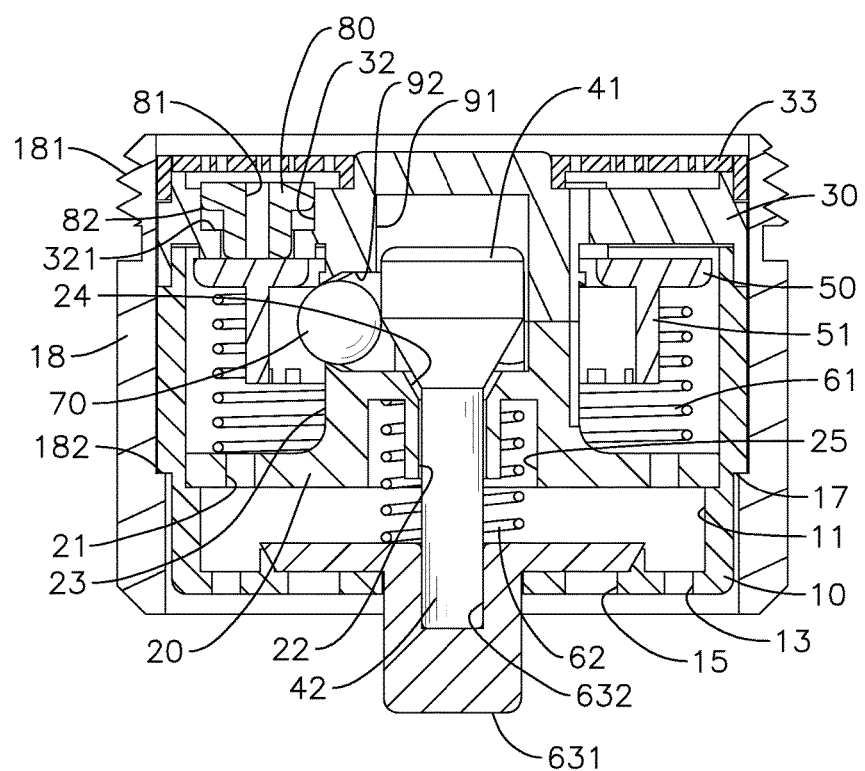
FIG. 4 is a first operational schematic view of the automatic water-saving device shown in FIG. 1.

With reference to FIGS. 1, 2, and 4, the housing 10 comprises a bottom wall, an inner space 11, a top opening 12, multiple first discharge holes 13, multiple second discharge holes 14, and a through hole 15. The first discharge holes 13, the second discharge holes 14, and the through hole 15 are formed through the bottom wall of the housing 10. In an embodiment, the through hole 15 is formed through a center of the bottom wall of the housing 10. The first discharge holes 13 are arranged at intervals and surround the through hole 15. The second discharge holes 14 are arranged at intervals and surround the through hole 15. The second discharge holes 14 are positioned between the first discharge holes 13 and the through hole 15. In another embodiment, the arrangements of the first discharge holes 13, the second discharge holes 14, and the through hole 15 are not limited to the arrangements mentioned above and may be varied as needed. In addition, the housing 10 is, but not limited to, cylindrical in profile.

With reference to FIGS. 1, 2, and 4, the mounting shell 18 is a tubular casing having two opposite apertures. The mounting shell 18 comprises a top end, an inner surface, a male thread 181 disposed on the top end, and a circular protrusion 182 formed transversely outwards on the inner surface. The housing 10 further comprises an outer surface and a protruding ring 17 formed transversely outwards on the outer surface. The protruding ring 17 may abut on a top surface of the circular protrusion 182 downwardly to mount the housing 10 on the mounting shell 18.

With reference to FIGS. 2 and 4, the lower holder 20 is disposed in the inner space 11. The lower holder 20 comprises multiple inner flow holes 21 and a perforation 22. In an embodiment, the inner flow holes 21 are arranged at intervals and are arranged around the perforation 22. The perforation 22 is disposed at a center of the lower holder 20. In another embodiment, the arrangements of the inner flow holes 21 and the perforation 22 are not limited to the arrangements mentioned above and may be varied as needed.

Figure 3:
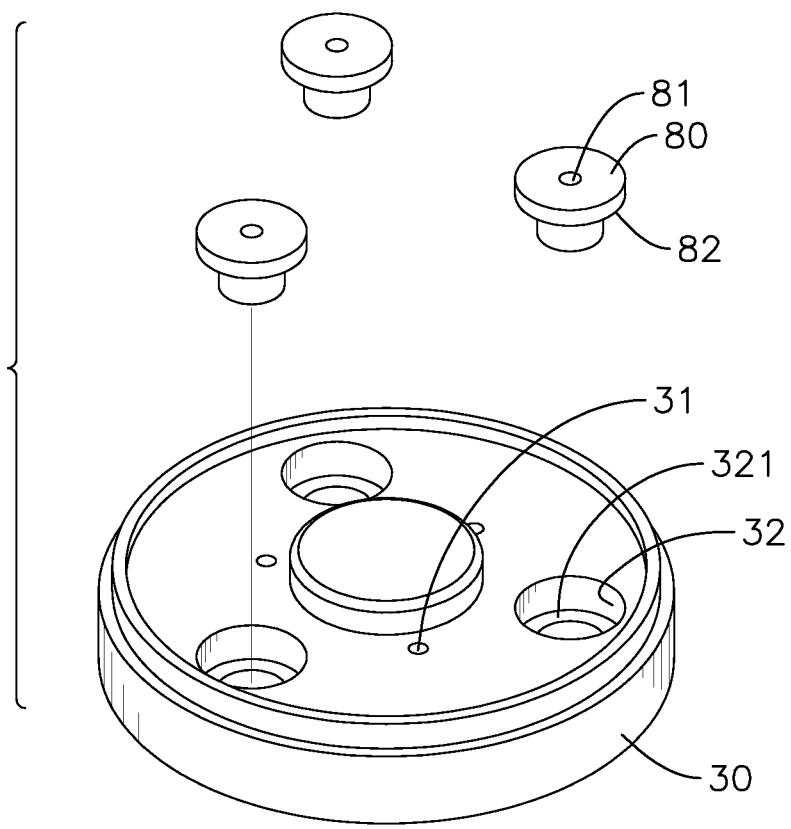
FIG. 3 is an exploded perspective view of an upper holder and multiple plugs of the automatic water-saving device shown in FIG. 1.

With reference to FIGS. 2 to 4, the upper holder 30 is disposed in the inner space 11. The upper holder 30 is disposed on a top surface of the lower holder 20. In other words, a bottom surface of the upper holder 30 is connected with the top surface of the lower holder 20. The upper holder 30 comprises multiple first inlet holes 31 and multiple mouths 32. In an embodiment, the first inlet holes 31 and the mouths 32 are arranged around an axial center of the upper holder 30. The first inlet holes 31 and the mouths 32 are arranged at intervals. The size of the first inlet holes 31 is less than the size of the mouths 32. In another embodiment, the arrangements and sizes of the first inlet holes 31 and the mouths 32 are not limited to the arrangements and sizes mentioned above and may be varied as needed.

With reference to FIGS. 2 and 4, the actuation space 91 and the transverse tunnels 92 are surrounded by the top surface of the lower holder 20 and the bottom surface of the upper holder 30. In an embodiment, the lower holder 20 further comprises a protruding bulk 23 protruding upwardly toward the upper holder 30 from the center of the lower holder 20. The protruding bulk 23 is a hollow column. The protruding bulk 23 abuts the bottom surface of the upper holder 30, thereby forming the actuation space 91 and the transverse tunnels 92 with the bottom surface of the upper holder 30. In an embodiment, the protruding bulk 23 may be formed by protruding downwardly toward the lower holder 20 from the upper holder 30. In an embodiment, the protruding bulk 23 may be formed by protruding both downwardly toward the lower holder 20 from the upper holder 30 and upwardly toward the upper holder 30 from the lower holder 20.

With reference to FIG. 4, the actuation space 91 is a vertically extending room. The actuation space 91 extends from the bottom surface of the upper holder 30, via the hollow of the protruding bulk 23, to the perforation 22 of the lower holder 20. Each of the transverse tunnels 92 is a perforation extending from a side wall of the protruding bulk 23 to a radial center of the protruding bulk 23. The transverse tunnels 92 are arranged at intervals and are connected with the actuation space 91.

With reference to FIGS. 1, and 4, the actuation rod 40 is mounted between the lower holder 20 and the upper holder 30. The actuation rod 40 is vertically movable relative to the lower holder 20 and the upper holder 30. Further, the actuation rod 40 is movably mounted in the actuation space 91. The actuation rod 40 comprises an upper actuation portion 41, a lower actuation portion 42, and a slant portion 43 connected between the upper actuation portion 41 and the lower actuation portion 42. The upper actuation portion 41 is mounted in the actuation space 91 and is vertically movable. The lower actuation portion 42 is mounted through the perforation 22 of the lower holder 20. The external diameter of the lower actuation portion 42 is smaller than the external diameter of the upper actuation portion 41. The external diameter of the slant portion 43 is decreased gradually from the upper actuation portion 41 to the lower actuation portion 42.

With reference to FIGS. 4, the lower holder 20 further comprises a chamfer 24 surrounding the perforation 22 and matching the slant portion 43. The chamfer 24 is inclined downwardly toward the perforation 22. The slant portion 43 selectively moves down and abuts the chamfer 24.

With reference to FIGS. 2 and 4, the baffle 63 is disposed in the inner space 11 and under the lower holder 20, and abuts the bottom wall of the housing 10. Specifically, the baffle 63 is mounted between the housing 10 and the lower holder 20, and is vertically movable relative to the housing 10 and the lower holder 20. The baffle 63 selectively closes the second discharge holes 14.

With reference to FIGS. 1, 2 and 4, the baffle 63 comprises a bottom surface, a top surface opposite the bottom surface, a button 631 formed on the bottom surface of the baffle 63 and extending downwardly from the baffle 63, and a combination recess 632 formed in the top surface of the baffle 63. The button 631 is mounted through the through hole 15 of the housing 10 and extends outwardly relative to the bottom wall of the housing 10. The combination recess 632 is disposed around and is fixed with the lower actuation portion 42. Specifically, a lower terminal of the lower actuation portion 42 is embedded in and fixed with the combination recess 632.

Figure 5:
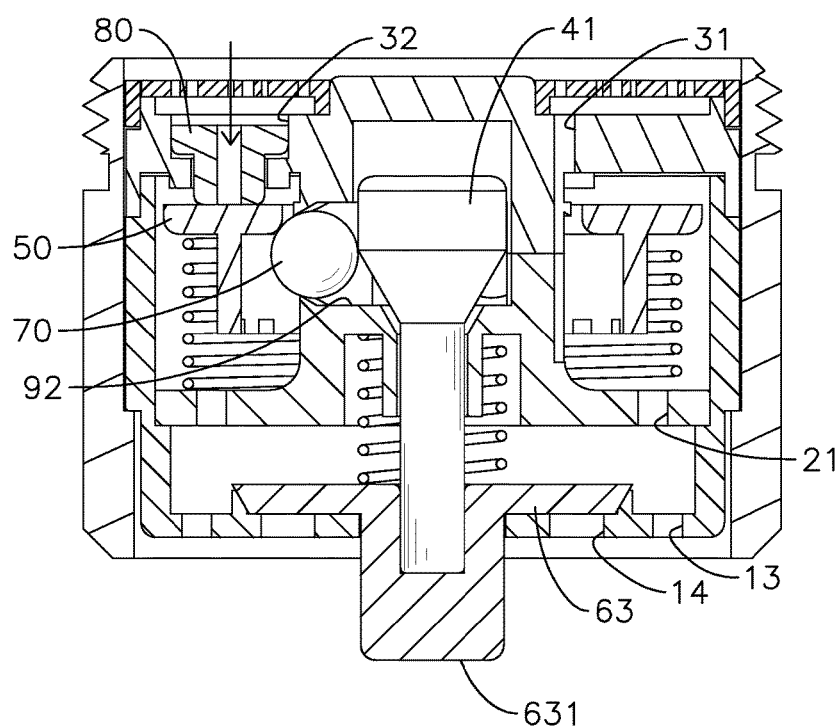
FIG. 5 is a second operational schematic view of the automatic water-saving device shown in FIG. 1.
Figure 6:
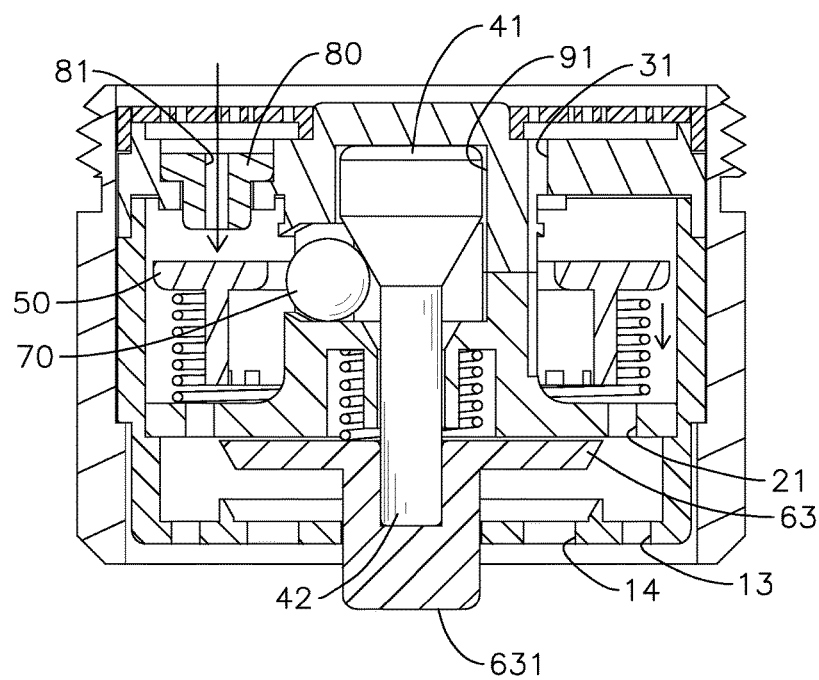
FIG. 6 is a third operational schematic view of the automatic water-saving device shown in FIG. 1.

With reference to FIGS. 4 to 6, in an embodiment, by covering the second discharge holes 14 with the baffle 63, the water flow capacity may be further increased as desired. In another embodiment, the baffle 63 and the second discharge holes 14 are omitted. In other words, a large water flow capacity may be obtained with the first discharge holes 13.

With reference to FIGS. 2 and 4, the blocker 50 is mounted between the lower holder 20 and the upper holder 30, and is vertically movable relative to the lower holder 20 and the upper holder 30. Besides, the blocker 50 surrounds the actuation space 91 and the transverse tunnels 92. The blocker 50 comprises a top surface, a bottom surface opposite to the top surface, and an annular wall 51. The top surface of the blocker 50 selectively closes the mouths 32 of the upper holder 30. The annular wall 51 is formed on and extends outwardly from the bottom surface of the blocker 50. The annular wall 51 surrounds the protruding bulk 23.

With reference to FIGS. 2, and 4, the first resilient member 61 is disposed between the lower holder 20 and the blocker 50. Further, the first resilient member 61 is mounted around the annular wall 51 of the blocker 50; that is, the annular wall 51 abuts an inner side of the first resilient member 61. In an embodiment, the first resilient member 61 may be, but not limited to, a compression spring.

With reference to FIGS. 2 and 4 to 6, the positioning balls 70 are disposed in the transverse tunnels 92 respectively. Each of the positioning balls 70 is movable along a corresponding one of the transverse tunnels 92. Specifically, the positioning balls 70 are disposed between the actuation rod 40 and the blocker 50. The upper actuation portion 41 of the actuation rod 40 selectively abuts the positioning balls 70 transversely. The blocker 50 selectively abuts the positioning balls 70 downwardly. When the upper actuation portion 41 of the actuation rod 40 transversely abuts the positioning balls 70 and the positioning balls 70 selectively abuts the blocker 50 upwardly, the blocker 50 cannot move downwardly. When the upper actuation portion 41 of the actuation rod 40 is separated from the positioning balls 70, the blocker 50 is allowed to compress the first resilient member 61, move downwardly, and be located at a position transversely adjacent to the positioning balls 70.

With reference to FIGS. 2 and 4, the second resilient member 62 is disposed in the housing 10 and pushes the actuation rod 40 downwardly. Further, the second resilient member 62 is mounted around the actuation rod 40, and is disposed between the actuation rod 40 and the bottom wall of the housing 10. Specifically, the lower holder 20 comprises a bottom surface and a mounting recess 25 formed in the bottom surface. The mounting recess 25 is annular in shape. An upper end of the second resilient member 62 is mounted in the mounting recess 25 and abuts the lower holder 20 upwardly. A lower end of the second resilient member 62 abuts the baffle 63 downwardly. Practically, the second resilient member 62 abuts the baffle 63 downwardly. Since the actuation rod 40 is fixed with the baffle 63, the second resilient member 62 abuts the bottom wall of the housing 10 indirectly. More specifically, the second resilient member 62 abuts the top surface of the baffle 63 and forces the baffle 63 to abut the bottom wall of the housing 10 downwardly. In an embodiment, the second resilient member 62 may be, but not limited to, a compression spring.

In an embodiment, the second resilient member 62 is, but not limited to, disposed between the lower holder 20 and the baffle 63. In an embodiment, the second resilient member 62 may be disposed in the transverse tunnels 92 and between the upper actuation portion 41 and the upper holder 30. In short, the second resilient member 62 is disposed at a position to provide a force for the baffle 63 and the actuation rod 40 to move downward. Further, in an embodiment, the second resilient member 62 may be omitted. The force for the baffle 63 and the actuation rod 40 to move downward may be provided by the gravity exerted on the actuation rod 40.

With reference to FIGS. 2 to 4, the plugs 80 are resilient and may be made of rubber. The plugs 80 are disposed in the mouths 32 respectively. Each of the plugs 80 is vertically movable in and selectively closes a corresponding one of the mouths 32. Each of the plugs 80 comprises a second inlet hole 81. The blocker 50 selectively abuts the plugs 80 upwardly and selectively closes the second inlet holes 81. In addition, the upper holder 30 comprises multiple stepped surfaces 321 surrounding the mouths 32. Each of the plugs 80 comprises a peripheral surface 82 matching a corresponding one of the stepped surfaces 321. Specifically, the peripheral surface 82 is selectively connected with the corresponding one of the stepped surfaces 321 from top to bottom.

In an embodiment, since the plugs 80 are resilient, the plugs 80 abut the blocker 50 tightly. Accordingly, the second inlet holes 81 are efficiently closed when the blocker 50 abuts the plugs 80 upwardly. In another embodiment, the second inlet holes 81 may be disposed on the upper holder 30 directly.

With reference to FIG. 1, the filter 33 is mounted on a top surface of the upper holder 30 to filtrate the water flow.

The automatic water-saving device of the present invention may be conveniently mounted on a faucet by threading the male thread of mounting shell 18 in the second inlet holes 81 with the female thread of the faucet.

The operational states inside the active water-saving device when in use are as follows:

With reference to FIG. 4, before the faucet is opened, there is no water flow inside the automatic water-saving device. The first resilient member 61 abuts the blocker 50 upwardly to force the blocker 50 to abut the bottom surface of the upper holder 30, so as to close the mouths 32 and the second inlet holes 81 of the plugs 80. Meanwhile, the second resilient member 62 abuts the baffle 63 downwardly to force the baffle 63 to close the second discharge holes 14, and allow the actuation rod 40 to move downwardly. The actuation rod 40 is positioned between the actuation space 91 and the transverse tunnels 92. Specifically, the upper actuation portion 41 abuts the positioning balls 70 transversely. Additionally, the first resilient member 61 abuts the blocker 50 upwardly.

FIG. 5 shows the operational state inside the automatic water-saving device after the faucet is opened and the button 631 has not been pushed yet. With reference to FIGS. 4 and 5, when the water flows through the filter 33, the water pushes the plugs 80. Each of the plugs 80 is forced to move further into the corresponding one of the mouths 32 and tightly abut the blocker 50, so as to keep the second inlet holes 81 closed. In addition, the blocker 50 tightly abuts the positioning balls 70. Since the positioning balls 70 are limited in the transverse tunnels 92 by the blocker 50 and the upper actuation portion 41 of the actuation rod 40, the position of the blocker 50 is fixed and the blocker 50 remains connected with the plugs 80 under the pushing of the water, thereby ensuring that the second inlet holes 81 are closed. Further, the baffle 63 still closes the second discharge holes 14. Accordingly, water only flows through the first inlet holes 31, the inner flow holes 21, and the first discharge holes 13 in sequence and the water discharge capacity is small.

FIG. 6 shows the operational state inside the automatic water-saving device after the faucet is opened and the button 631 is pushed. With reference to FIGS. 2 and 6, when the button 631 is pushed upwardly, the upper actuation portion 41 of the actuation rod 40 is moved upwardly to the upper part of the actuation space 91 and is separated from the positioning balls 70. As the external diameter of the lower actuation portion 42 is smaller than the external diameter of the upper actuation portion 41, the positioning balls 70 in the transverse tunnels are allowed to move towards the actuation space 91 and depart from the blocker 50. In this way, the blocker 50 is pushed to move down by the water flowing through the second inlet holes 81, and the second inlet holes 81 are opened. Besides, the positioning balls 70 abut the slant portion 43 and the upper actuation portion 41 is limited at the upper part of the actuation space 91. Additionally, since the button 631 is pushed upwardly, the second discharge holes 14 are opened. Accordingly, the water flows not only through the path of the first inlet holes 31, the inner flow holes 21, the first discharge holes 13, and the second discharge holes 14, but also through the loop of second inlet holes 81, the inner flow holes 21, the first discharge holes 13, and the second discharge holes 14. Therefore, the water discharge capacity is large.

With reference to FIGS. 4 to 6, after the faucet is closed, the water flow is stopped. The first resilient member 61 forces the blocker 50 to move up, to be departed from the positioning balls 70, and to abut the bottom surface of the upper holder 30, so as to close the mouths 32 and the second inlet holes 81 of the plugs 80. Besides, the second resilient member 62 forces the baffle 63 to move down and abut the bottom wall of the housing 10, so as to close the second discharge holes 14. Since the lower actuation portion 42 is fixed with the baffle 63, the actuation rod 40 is driven to move down with the baffle 63. When the actuation rod 40 moves down, the positioning balls 70 are pushed to abut the blocker 50 by the slant portion 43. Accordingly, after the operational sequence of opening the faucet, pushing the button 631, and closing the faucet, the operational state inside the automatic water-saving device before the faucet is opened is automatically recovered.

Based on the above, the automatic water-saving device is not only able to save water, but also able to automatically recover the water discharge capacity back to small volume after the water discharge capacity is manually adjusted to large volume. Accordingly, the water-saving function of the automatic water-saving device is enhanced and ensured, and the automatic water-saving device is convenient in use.

What is claimed is:
1. An automatic water-saving device comprising:
 a housing comprising:
  a bottom wall;
  an inner space;
  a top opening;
  multiple first discharge holes formed through the bottom wall; and
  a through hole formed through a center of the bottom wall;
 a lower holder disposed in the inner space and comprising:
  a perforation; and
  multiple inner flow holes disposed around the perforation;
 an upper holder disposed in the inner space, disposed on a top surface of the lower holder, and comprising multiple first inlet holes and multiple mouths;
 an actuation space and multiple transverse tunnels surrounded by the top surface of the lower holder and a bottom surface of the upper holder, wherein the actuation space extends longitudinally and corresponds to a center of the upper holder, and the transverse tunnels are transversely connected with the actuation space;
 an actuation rod mounted between the lower holder and the upper holder, being vertically movable relative to the lower holder and the upper holder, and comprising:
  an upper actuation portion mounted in the actuation space and being vertically movable; and
  a lower actuation portion mounted through the perforation and having an external diameter smaller than the upper actuation portion;
 a blocker mounted between the lower holder and the upper holder, being vertically movable relative to the lower holder and the upper holder, the blocker surrounding the actuation space and the transverse tunnels, and having a top surface selectively closing the mouths;
 a first resilient member disposed between the lower holder and the blocker and pushing the blocker upwardly; and
 multiple positioning balls disposed in the transverse tunnels respectively and disposed between the actuation rod and the blocker, wherein the upper actuation portion selectively abuts the positioning balls transversely and the blocker selectively abuts the positioning balls downwardly.

2. The automatic water-saving device as claimed in claim 1, wherein the automatic water-saving device further comprises a second resilient member disposed in the housing and pushing the actuation rod downwardly.

3. The automatic water-saving device as claimed in claim 2, wherein the second resilient member is mounted around the actuation rod, and is disposed between the actuation rod and the bottom wall of the housing.

4. The automatic water-saving device as claimed in claim 1, wherein the automatic water-saving device further comprises multiple plugs disposed in the mouths respectively, each of the plugs is vertically movable in and selectively closes a corresponding one of the mouths, each of the plugs comprises a second inlet hole, and the blocker selectively abuts the plugs upwardly and selectively closes the second inlet holes, and the plugs are resilient.

5. The automatic water-saving device as claimed in claim 3, wherein the automatic water-saving device further comprises multiple plugs disposed in the mouths respectively, each of the plugs is vertically movable in and selectively closes a corresponding one of the mouths, each of the plugs comprises a second inlet hole, and the blocker selectively abuts the plugs upwardly and selectively closes the second inlet holes, and the plugs are resilient.

6. The automatic water-saving device as claimed in claim 4, wherein the upper holder comprises multiple stepped surfaces surrounding the mouths respectively, and each of the plugs comprises a peripheral surface matching a corresponding one of the stepped surfaces.

7. The automatic water-saving device as claimed in claim 5, wherein the upper holder comprises multiple stepped surfaces surrounding the mouths respectively, and each of the plugs comprises a peripheral surface matching a corresponding one of the stepped surfaces.

8. The automatic water-saving device as claimed in claim 1, wherein:

the housing further comprises multiple second discharge holes formed through the bottom wall of the housing; and the automatic water-saving device further comprises a baffle disposed in the inner space, fixed with the lower actuation portion, and selectively closing the second discharge holes.

9. The automatic water-saving device as claimed in claim 3, wherein:

the housing further comprises multiple second discharge holes formed through the bottom wall of the housing; and the automatic water-saving device further comprises a baffle disposed in the inner space, fixed with the lower actuation portion, and selectively closing the second discharge holes.

10. The automatic water-saving device as claimed in claim 5, wherein:

the housing further comprises multiple second discharge holes formed through the bottom wall of the housing; and the automatic water-saving device further comprises a baffle disposed in the inner space, fixed with the lower actuation portion, and selectively closing the second discharge holes.

11. The automatic water-saving device as claimed in claim 1, wherein the actuation rod further comprises a slant portion disposed between the upper actuation portion and the lower actuation portion, and the external diameter of the slant portion is decreased gradually from the upper actuation portion to the lower actuation portion.

12. The automatic water-saving device as claimed in claim 10, wherein the actuation rod further comprises a slant portion disposed between the upper actuation portion and the lower actuation portion, and the external diameter of the slant portion is decreased gradually from the upper actuation portion to the lower actuation portion.

13. The automatic water-saving device as claimed in claim 1, wherein the blocker further comprises an annular wall formed on and extending outwardly from a bottom surface of the blocker, and the annular wall abuts an inner side of the first resilient member.

14. The automatic water-saving device as claimed in claim 12, wherein the blocker further comprises an annular wall formed on and extending outwardly from a bottom surface of the blocker, and the annular wall abuts an inner side of the first resilient member.

15. The automatic water-saving device as claimed in claim 1, wherein the lower holder further comprises a protruding bulk protruding upwardly toward the upper holder from a center of the lower holder, and the actuation space and the transverse tunnels are formed between the protruding bulk of the lower holder and the bottom surface of the upper holder.

16. The automatic water-saving device as claimed in claim 14, wherein the lower holder further comprises a protruding bulk protruding upwardly toward the upper holder from a center of the lower holder, and the actuation space and the transverse tunnels are formed between the protruding bulk of the lower holder and the bottom surface of the upper holder.

17. The automatic water-saving device as claimed in claim 1, wherein the automatic water-saving device further comprises a filter mounted on a top surface of the upper holder.

18. The automatic water-saving device as claimed in claim 16, wherein the automatic water-saving device further comprises a filter mounted on a top surface of the upper holder.

* * * * *